United States Patent [19]

Kolhoff et al.

[11] Patent Number: 4,969,388
[45] Date of Patent: Nov. 13, 1990

[54] PISTON-CYLINDER DEVICE TO BE POWERED BY A PRESSURE FLUID

[75] Inventors: Kenk Kolhoff, An Haaksbergen; Lambertus J. Sonneborn, Em Oldenzaal, both of Netherlands

[73] Assignee: Applied Power Inc., Butler, Wis.

[21] Appl. No.: 223,372

[22] Filed: Jul. 25, 1988

[30] Foreign Application Priority Data

Sep. 23, 1987 [NL] Netherlands ............... 8702269

[51] Int. Cl.⁵ .................................. F15B 15/26
[52] U.S. Cl. .................................. 92/27; 296/117; 296/120.1
[58] Field of Search ............ 296/112, 115, 117, 120.1, 296/121; 92/15, 23, 27, 28

[56] References Cited

U.S. PATENT DOCUMENTS

| 2,128,849 | 8/1938 | Redfern | 296/117 |
| 2,493,875 | 1/1950 | Hunter | 92/27 |
| 3,199,289 | 8/1965 | Ramsey et al. | 92/23 X |
| 3,342,524 | 9/1967 | Adamski | 296/117 |
| 3,397,620 | 8/1968 | Skelton et al. | 92/28 X |
| 3,470,793 | 10/1969 | Herbert-Erwin Hanchen | 92/28 X |
| 3,492,922 | 2/1970 | Van Sickle | 92/15 X |
| 3,584,544 | 6/1971 | Haberman | 92/28 X |
| 3,964,370 | 6/1976 | Rich | 91/395 |
| 3,974,910 | 8/1976 | Papai | 91/394 X |
| 4,078,778 | 3/1978 | Hubweber | 92/23 X |
| 4,085,960 | 4/1978 | Sherman | 180/89.13 X |
| 4,188,860 | 2/1980 | Miller | 92/23 X |
| 4,635,536 | 1/1987 | Liu | 92/28 X |
| 4,784,044 | 11/1988 | Klement | 92/24 |

FOREIGN PATENT DOCUMENTS 2531394 1/1976 Fed. Rep. of Germany.
7712575 11/1977 Netherlands.
1543901 4/1979 United Kingdom.

Primary Examiner—Dennis H. Pedder
Attorney, Agent, or Firm—Quarles & Brady

[57] ABSTRACT

A piston-cylinder device powered by a pressurized fluid and having a mechanical locking means for the piston. The locking means is alternatively actuated into and out of locking position by the pressurized fluid.

2 Claims, 2 Drawing Sheets

FIG. 2A
FIG. 2B
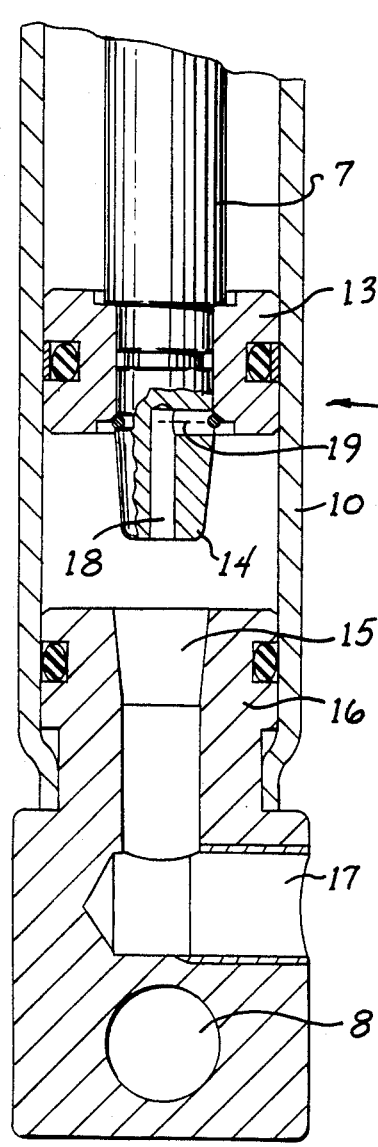
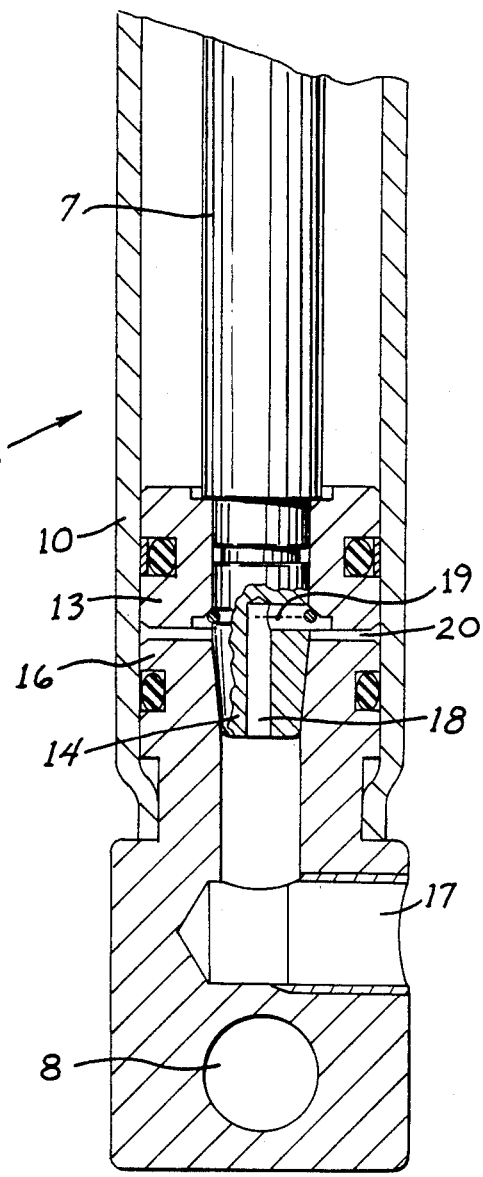

PISTON-CYLINDER DEVICE TO BE POWERED BY A PRESSURE FLUID

CROSS-REFERENCE TO RELATED APPLICATIONS

Priority Application: Netherlands Ser. No. 87 02269. Filed: 23 Sept. 1987.

BACKGROUND OF THE INVENTION

1. Field of the Invention

The invention relates to a piston-cylinder device to be powered by a pressurized fluid, said device cooperating in at least one of its piston end positions with a locking means which is releasable by the pressure fluid, the piston-cylinder device being mechanically lockable by the locking means.

2. Description of Related Art

Piston-cylinder devices, among other uses, have been provided as the tilting device in vehicles having a forwardly tiltable cabin. The locking means cooperating with the piston-cylinder device is therein formed by a separate device whereby the cab is locked in the driving position, namely through the intermediary of a locking hook which in the locking position engages with the car frame. In this position the locking hook is inserted in the pressure fluid circuit of the tilting device such that when the circuit is energized, the locking hook is moved to the released position before pressure can be supplied to the tilting device.

SUMMARY OF THE INVENTION

The present invention aims at essentially simplifying a piston-cylinder device having a locking function for applications as has been described above and also for different applications, without making concessions to the reliability of the locked condition.

The piston-cylinder device as proposed by the invention is characterized in that the locking means is formed by at least one pin extending at the relative cylinder end in axial direction from the piston end surface or the cylinder bottom respectively, said pin jammingly engaging with a corresponding bore in the opposite cylinder bottom or the opposite piston end surface respectively.

In the piston-cylinder device according to the invention thereby the locking means is integrated in the device. Thereby, in relation to the known structure, the conduits connecting the locking means with the piston cylinder device and with the pressure fluid source are eliminated while the pressure fluid circuit has become essentially simpler and less failure sensitive.

At the end of the operative piston stroke in the direction of the end position to be locked the locking pin is clampingly engaged with the locking bore under the influence of the pressure imparted to the piston. Said clamping engagement continues after the release of the pressure and may only be removed by pressurizing the piston in the opposite direction.

A particular application of the device according to the invention is that for opening and closing the (folding) roof of a vehicle of the convertible type. For such an application the known structure having a separate locking device would entail problems relative to the accommodation of the many conduits and the separate locking device.

In a practical embodiment in which the pin is secured to the piston, the bore is connected with the pressure fluid supply and the pin is provided with an axial channel which opens in the piston head part surrounding the pin, through a transverse channel provided at the pin base.

Thereby the pressure supplied for moving the piston from its locked position will become directly operative on the total piston surface and a slight overpressure relative to the normally necessary pressure will be sufficient to remove the clamping force between the pin and the bore and therewith cancel the locking condition.

In a preferred embodiment which, moreover, combines with an accurately defined piston end position, the pin and the corresponding bore are somewhat conically shaped.

DESCRIPTION OF THE DRAWINGS

FIGS. 2A and 2B illustrate an end portion of the piston cylinder device according to the invention, namely with the piston on its way towards (FIG. 2A) its end position and in (FIG. 2B) its retracted end position respectively.

Figure 1:
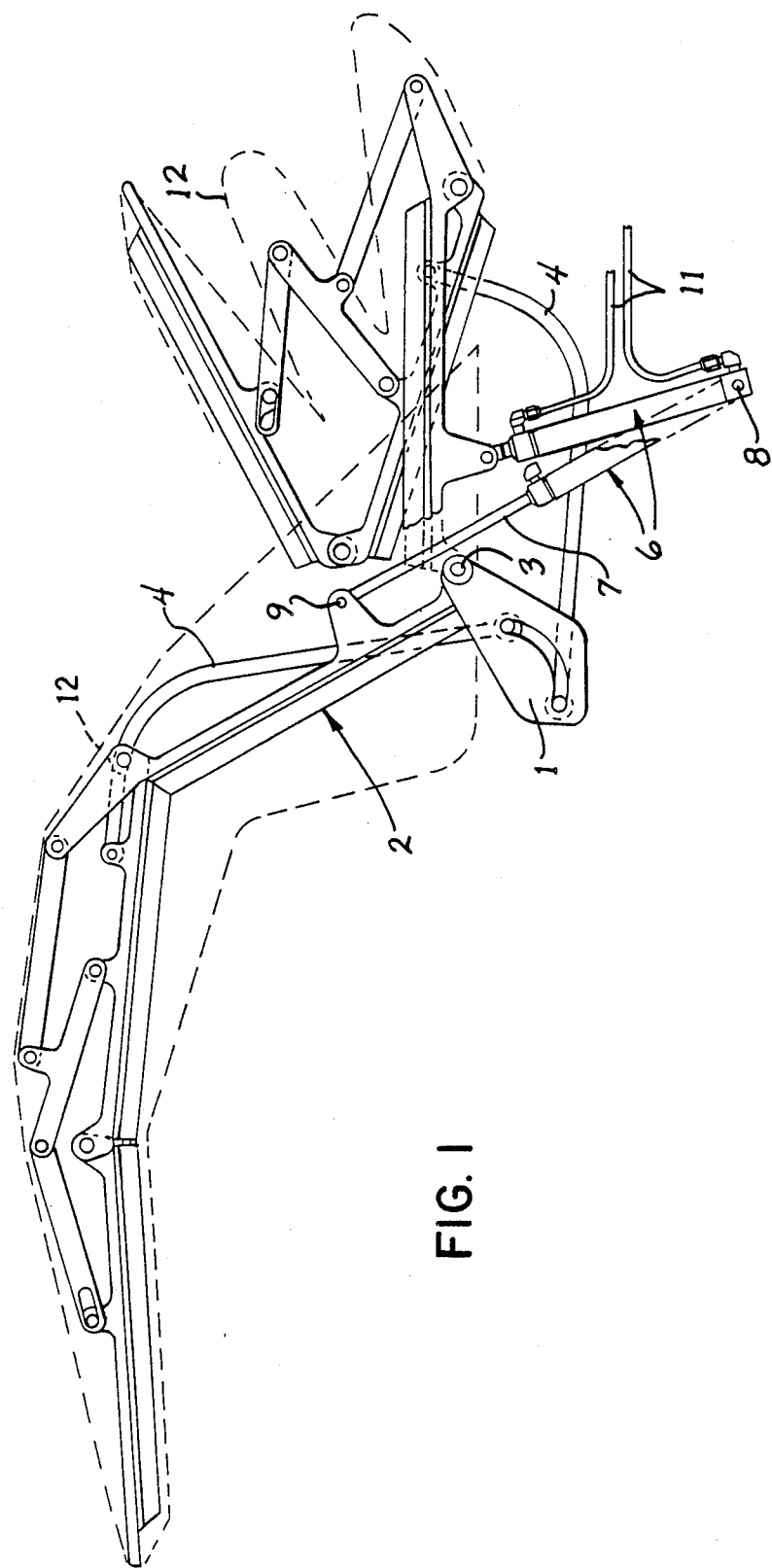
FIG. 1 shows the application of the device according to the invention as a device for opening and closing a folding roof of a vehicle.

The folding roof as shown in FIG. 1 is constructed in a manner known per se. At both sides of the car body (not shown) of the vehicle there is a fixed mounting plate 1 to which the folding roof frame 2 is articulated at 3 and which serves simultaneously as guiding element for a folding guide rod 4.

At both sides of the car body a hydraulic piston device 6 according to the invention is mounted with its end remote from the piston rod 7 articulated in a fixed point 8. The free piston rod end is at 9 hinged to the folding roof frame 2. The pressure and return conduits 11 respectively connect opposite ends of a cylinder 10 with a stationary pump and pressure fluid source (not shown).

The drawing shows the folding roof in two positions, namely the closed position I in which the roof covering 12 encloses the frame 2 in tight condition and the open position II in which the roof covering 12 has been folded in pleats between the collapsed members of the frame 2. In the closed position I the piston rod 7 is in its (fully) extended position, whereas the open position II of the roof corresponds with the retracted position of the piston cylinder device 6. The roof is locked in the open position by a locking device integrated in the device 6, which locking device is hereunder further described with reference to FIGS. 2A and 2B.

The piston 13 operates within a cylindrical bore of the cylinder 10. The piston rod 7 is fastened to the piston 13 adjacent a top head surface of the piston. An opposite bottom head surface of the piston 13 is provided with a central, slightly conical pin 14 cooperating with a central, slightly conical bore 15 in the cylinder bottom 16. Entrance bore 17 provides means for connection with one of the pressure/return conduits 11.

FIG. 2A shows the device 6 in a position in which the piston 13 approaches its retracted end position, and wherein the roof has practically reached its open condition.

In FIG. 2B the piston 13 has been halted in an end position in which the conical pin 14 has been forced into seating engagement with the conical bore 15 under the influence of the pressure prevailing at the piston rod side. The clamping action achieved by the seating engagement of the pin 14 and bore 15 provides a means of locking of the roof in the open condition II until a pressure is generated through the connection 17 in the space below the piston 13. The pin 14 is provided with an axial channel 18 opening at one end at the annular piston head surface and communicating at its opposite end with a transverse channel 19. The hydraulic liquid may reach the space 20 defined by the annular piston head surface and the cylinder bottom through said channels 18, 19. When closing the roof from the locked open position II the pressure of the hydraulic liquid supplied at the bottom side of the cylinder will therefore immediately be operative on the total piston head surface, to guarantee an effective release.

It will be clear that the clamping action to be surmounted when opening the roof will not always be the same for both piston cylinder devices. However, when using hydraulic connection designs, known in the field of hydraulic cab titling devices, a synchronous movement of both hydraulic cylinders can be attained.

What is claimed is:

1. A hydraulic piston cylinder mechanism to be powered by a hydraulic fluid under pressure and adapted to include a locked position at an end of a piston stroke, said hydraulic piston cylinder mechanism comprising:
   a housing having:
      a top end;
      an opposite bottom end;
      a cylindrical bore extending between said top end and said bottom end; and
      a locking bore in said bottom end;
   a piston slidably positioned within said cylindrical bore, said piston having:
      a top head surface;
      an opposite bottom head surface; and
      a locking pin extending from said bottom head surface, said locking pin being conically shaped and adapted to seatingly engage said locking bore to provide a mechanical lock for said piston;
   first means for supplying a hydraulic fluid under pressure, said first hydraulic fluid supply means being in fluid communication with the bottom side of said locking bore; and
   wherein:
      said first hydraulic fluid supply means is operable to supply a hydraulic fluid under pressure to dislodge said locking pin from seating engagement with said locking bore; and
      said locking pin is provided with an axial channel and a transverse channel, said axial and transverse channels being in fluid communication and providing fluid communication from said first hydraulic fluid supply means to said bottom head surface of said piston.

2. A hydraulic piston cylinder mechanism to be powered by a hydraulic fluid under pressure and adapted to include a locked position at end of a piston stroke, said hydraulic piston cylinder mechanism comprising:
   a housing having:
      a top end;
      an opposite bottom end;
      a cylindrical bore extending between said top end and said bottom end; and
      a locking bore in said bottom end; said locking bore being conically shaped;
   a piston slidably positioned within said cylindrical bore, said piston having:
      a top head surface;
      an opposite bottom head surface; and
      a locking pin extending from said bottom head surface, said locking pin adapted to seatingly engage said locking bore to provide a mechanical lock for said piston;
   first means for supplying a hydraulic fluid under pressure, said first hydraulic fluid supply means being in fluid communication with the bottom side of said locking bore; and
   wherein:
      said first hydraulic fluid supply means is operable to supply a hydraulic fluid under pressure to dislodge said locking pin from seating engagement with said locking bore; and
      said locking pin is provided with an axial channel and a transverse channel, said axial and transverse channels being in fluid communication and providing fluid communication from said first hydraulic fluid supply means to said bottom head surface of said piston.

* * * * *